United States Patent [19]

Hinkle

[11] Patent Number: 4,962,967
[45] Date of Patent: Oct. 16, 1990

[54] STONE SLOTTING MACHINE

[76] Inventor: John H. Hinkle, 2225 Rockport Rd., Bloomington, Ind. 47401

[21] Appl. No.: 355,432

[22] Filed: May 22, 1989

[51] Int. Cl.$^5$ .......................... F21C 31/04; F21C 41/12
[52] U.S. Cl. .................................... 299/41; 125/13.01; 125/16.04; 299/15
[58] Field of Search ................... 299/15, 41, 53, 54, 299/72, 89; 125/12, 13 R, 14, 16 R, 16 F, 18; 403/296, 343

[56] References Cited

U.S. PATENT DOCUMENTS

| | | | |
|---|---|---|---|
| 99,139 | 1/1870 | Blanchard et al. | 299/41 |
| 207,374 | 8/1878 | Webster | 299/41 |
| 880,903 | 3/1908 | Mowlds | 175/57 |
| 1,170,986 | 2/1916 | Mowlds | 299/38 |
| 1,786,225 | 12/1930 | Boudette | 299/72 |
| 1,891,539 | 12/1932 | Honnors | 403/296 X |
| 3,675,972 | 7/1972 | Slomito | 299/241 |
| 3,982,521 | 9/1976 | Bieri | 125/16 R |

FOREIGN PATENT DOCUMENTS

| | | | |
|---|---|---|---|
| 0079323 | 5/1983 | European Pat. Off. | 125/16 R |
| 3240471 | 4/1984 | Fed. Rep. of Germany | 125/13 R |
| 3445073 | 6/1986 | Fed. Rep. of Germany | 299/53 |
| 275412 | 8/1927 | United Kingdom | 299/54 |

Primary Examiner—Bruce M. Kisliuk
Assistant Examiner—David J. Bagnell
Attorney, Agent, or Firm—Woodard, Emhardt, Naughton Moriarty & McNett

[57] ABSTRACT

A stone slotting machine includes a main frame movable on tracks disposed on the ground at a stone quarry. The slotting machine further includes cutting blade having an arbor frame, a number of cutting cylinders attached and aligned together and being rotatably mounted to the arbor frame and a drive motor for rotating the number of attached and aligned cutting cylinders relative to the arbor frame. The arbor cutting blade is reciprocatably supported on a carriage. The carriage itself is supported on the main frame by a carriage support assembly. The carriage support assembly includes a rotating hub affixed to the carriage that is rotatably supported by a pair of bearing collars. A hydraulic piston is provided to rotate the hub within the bearing collars, thereby rotating the carriage and arbor cuttling blade within a plae defined by the arbor cutting blade. The carriage support assembly further includes a back plate and vertical support beams to which the bearing collars are mounted. A tilting mechanism is provided to tilt the carriage support assembly, carriage and arbor cutting blade relative to the main frame such that the carriage and arbor cutting blade swings within a vertical plane perpendicular to the main from, so that the arbor cutting blade can be tilted from a first upright position for making horizontal cuts in the stone, to a second horizontal position for making vertical cuts in the stone.

11 Claims, 7 Drawing Sheets

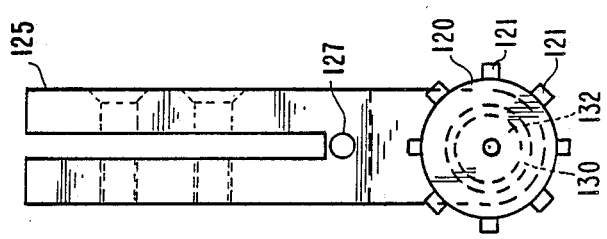
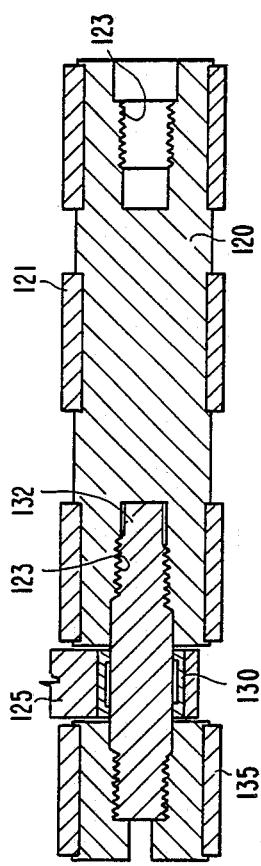
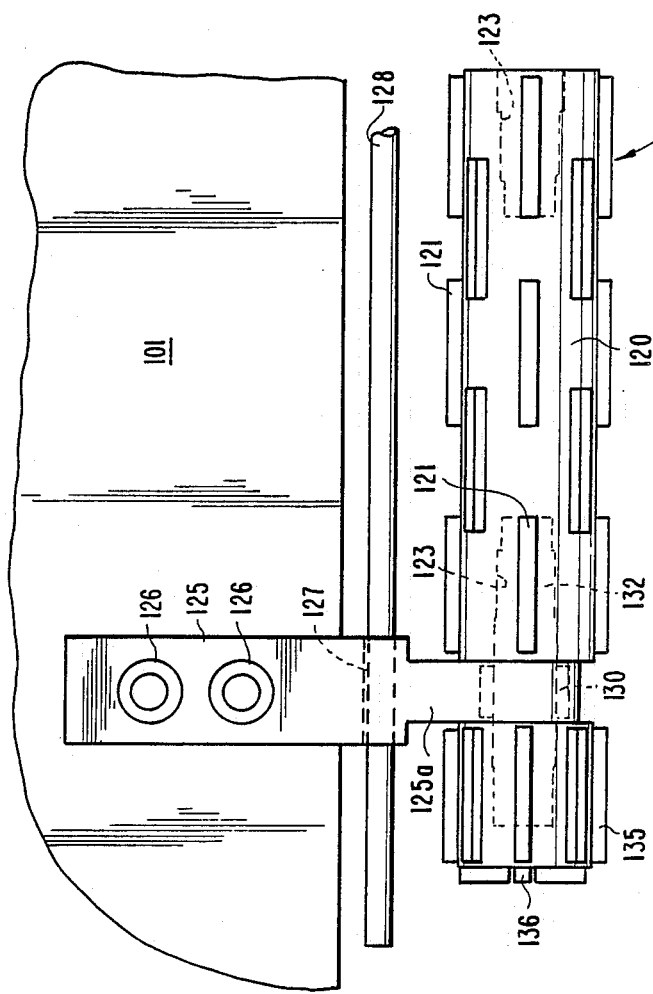

STONE SLOTTING MACHINE

BACKGROUND OF THE INVENTION

This invention is in the field of cutting or slotting devices for stone, marble and similar material. In particular, this invention concerns stone cutting or slotting apparatus that use a reciprocating cutting blade.

Cutting and removing stone from the earth is an ancient art. Within the last one and a half centuries, various motor-driven machines have been formulated to facilitate man's ability to extract large, single pieces of stone from the earth. The object of these various devices is often to increase the length of the cutting device so as to enable larger blocks of stone to be cut. In addition, a further object has been to cut the stone as quickly and easily as possible.

Some of the various apparatus of the prior art utilize a heavy chisel that is dropped onto the stone with a great force thereby cracking the stone. Other apparatus utilize a rotating belt having stone cutting elements mounted thereon. Still another such apparatus employs a rotating arbor mounted on a reciprocating frame. The patent to Slomito, U.S. Pat. No. 3,675,972, is indicative of such a stone slotting machine.

There is a need for a new improved machine for cutting slots into stone that has a sufficiently long cutting element to enable large blocks of stone to be cut. Moreover, the improved machine should be able to cut the stone in a variety of orientations. That is, the new machine should have the capability of making horizontal as well as vertical slots into the stone which is to be removed from the earth.

BRIEF DESCRIPTION OF THE DRAWINGS

FIG. 8 is an enlarged partial view of the arbor assembly as mounted on the cutting blade.

FIG. 9 is an end view of the arbor assembly.

FIG. 10 is a cross-sectional view of the arbor assembly showing the threaded connecting shaft.

DESCRIPTION OF THE PREFERRED EMBODIMENT

Figure 1:
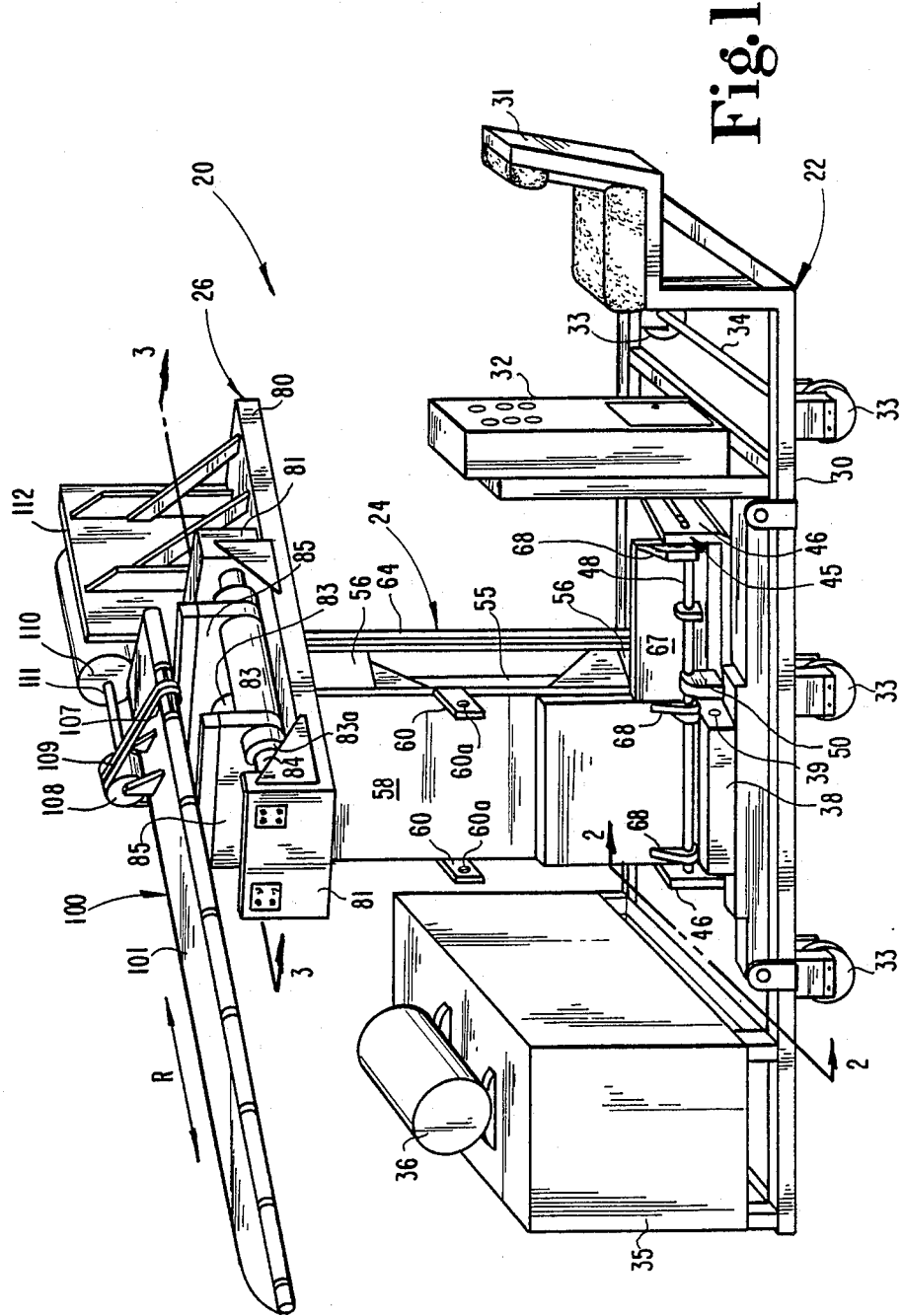
FIG. 1 is a perspective view of a stone slotting machine incorporating the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

The present invention is utilized to cut or grind a slot or channel in natural or artificial stone, marble, granite or like material, for the purpose of quarrying and removing the cut stone. The machine generally employs a high speed rotating arbor unit using diamonds or other suitable material, as a cutting surface, in which the arbor unit is secured to a reciprocating carriage unit. The high speed rotating arbor cuts a slot in the stone as the arbor unit is reciprocated. The arbor is pivotable about an axis at the end of the arbor thereby allowing the arbor to be swung or pitched to a particular desired position.

Figure 2:
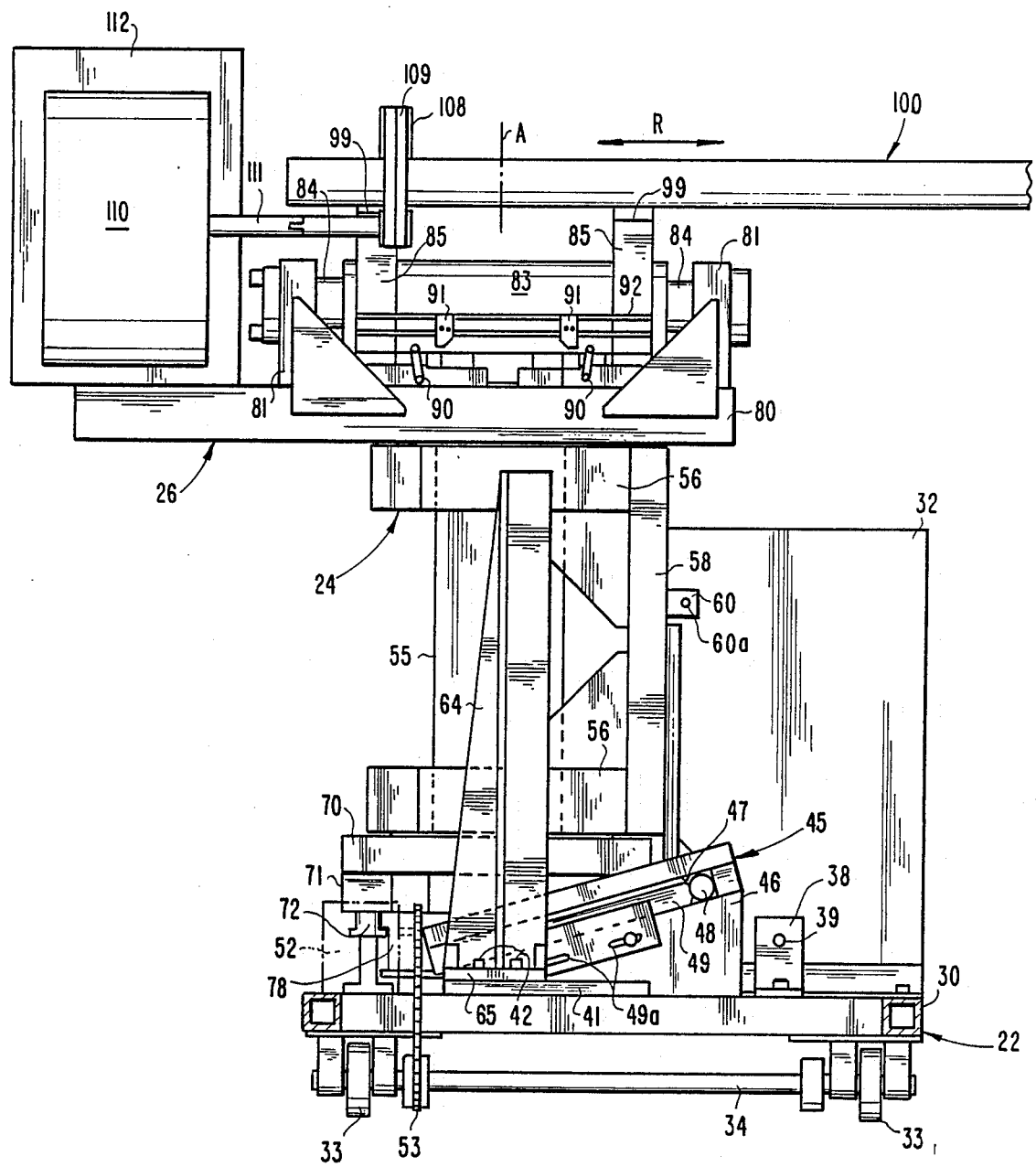
FIG. 2 is a side partial cross-section view of the stone slotting machine of FIG. 1, taken along line 2—2 as viewed in the direction of the arrows.

Referring now more particularly to FIGS. 1 and 2, there is illustrated a stone slotting machine which consists of a main frame assembly 22, a carriage support assembly 24 and a blade carriage assembly 26. The frame assembly 22 includes a number of frame beams 30 suitably arranged in longitudinal and crossing fashion to form a rigid support frame. In the preferred embodiment the beams 30 are three inch square steel tubing. An operator seat 31 is mounted to the frame beams 30. A control panel 32 is also mounted to the beams and is arranged to face the seated operator. The control panel 32 includes a number of switches and levers to control the electrical and hydraulic functions of the stone slotting machine 20. A number of track engaging wheels 33 are suitably mounted to the frame beams 30. An axle 34 extends between pairs of track engaging wheels 33 on opposite sides of the frame assembly 22. The track engaging wheels 33 are driven in a conventional fashion by a drive motor 52 and standard chain drive 53 (see also FIG. 4). As shown more clearly in FIGS. 6 and 7, a track T is located at a job site, such as a limestone quarry, with the track engaging wheels 33 situated within the track T. During the cutting operation, the stone slotting machine 20 slowly travels along the track T while the cutting blade contacts the limestone L to produce a long slot S in the stone.

Returning to FIGS. 1 and 2, a hydraulic fluid reservoir 35 is provided. A hydraulic pump 36 controls the flow of hydraulic fluid to and from the fluid reservoir and the various hydraulic components of the stone slotting machine 20. In the preferred embodiment of the stone slotting machine, the cutting blade is reciprocated using a two way hydraulic piston, as is described herein. Moreover, the blade angle or pitch is also controlled by a hydraulic cylinder. Both components draw fluid power from the reservoir 35 and pump 36. In the preferred embodiment, the pump 36 is capable of a flow rate of 30 gallons per minute.

Mounted on the frame beams 30 is a horizontal locking block 38 having a bore 39 extending through the length of the block. The horizontal locking block 38 is used to support the carriage support assembly in a horizontal orientation, as described more fully herein. A pair of vertical locking blocks 41 (FIG. 2) are affixed to the frame assembly 22 on the opposite sides of the carriage support assembly 24. Each of the vertical locking blocks 41 includes a pair of upwardly projecting posts 42. The vertical locking block 41 and post 42 provide a means for supporting the carriage support assembly 24 in a vertical orientation.

Figure 6:
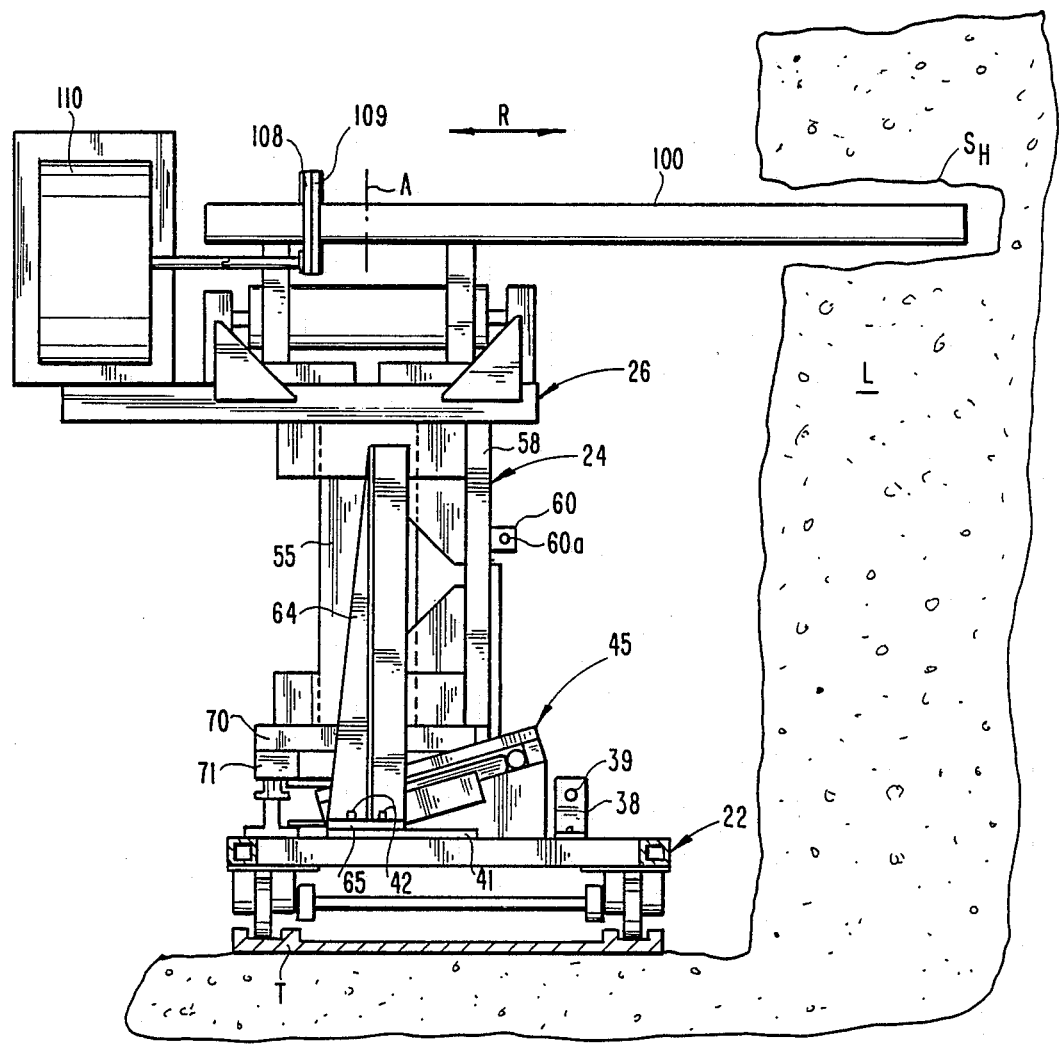
FIG. 6 is a schematic representation of the stone slotting machine of FIG. 1 as shown with the cutting blade oriented to cut a horizontal slot in a lime stone quarry.
Figure 7:
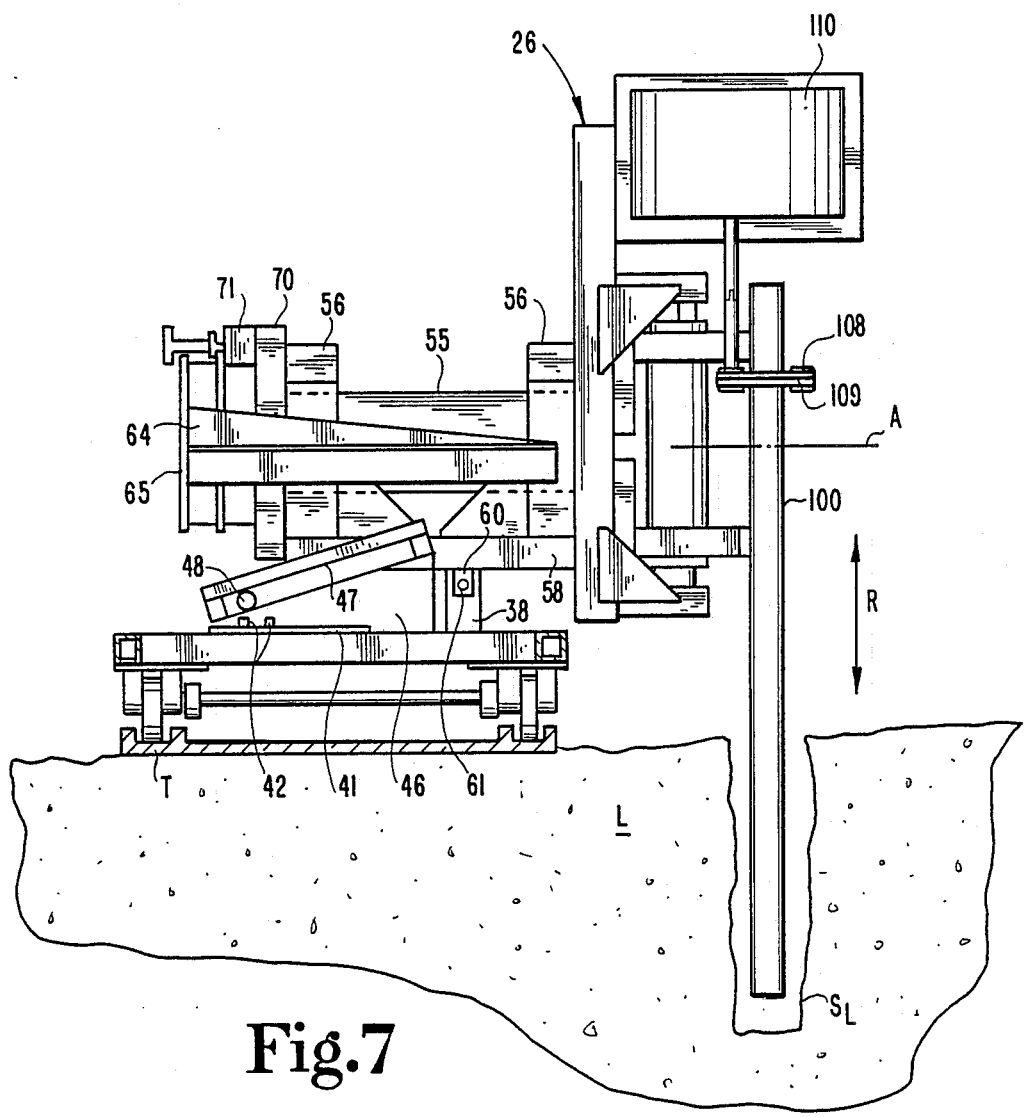
FIG. 7 is a schematic view of the stone slotting machine as shown in FIG. 6 with the cutting blade pivoted to permit the cutting of a vertical slot into the limestone.

In a novel aspect of the present invention, the carriage support assembly, with the blade carriage assembly mounted thereon, can be tilted from the vertical orientation shown in FIGS. 2 and 6 to a horizontal or laid over orientation as shown in FIG. 7. When the carriage support assembly 24 is vertically oriented as in FIG. 6, the cutting blade cuts a horizontal slot $S_h$ in the limestone L. When the carriage support assembly 24 is tilted into its horizontal orientation as in FIG. 7, the blade cuts a vertical slot $S_v$ The tilting means or mechanism 45 which permits this movement of the carriage support assembly, includes a pair of cross beams 46 at opposite sides of the carriage support assembly 24 that are affixed to the frame beams 30 of the frame assembly 22. Each of the cross beams 46 includes an angles slot 47 opening along the length of the cross beam 46. In the preferred embodiment, the slot 47 is oriented at a 16° angle relative to the horizontal frame assembly 22. However, this angle may be varied according to changes in the geometry and structure of the frame assembly 22 and the carriage support assembly 24. A tilt rod 48 extends between the cross beams 46 and is engaged within the slots 47 of each of the ramps. The tilt rod 48 is affixed to the carriage support assembly 24, as described more fully herein. When the carriage support assembly 24 is in its vertical orientation, the tilt rod 48 is at the upper end of the slot 47 (see FIGS. 2 and 6). An intermediate rod support 50 is affixed to the frame assembly 22 in order to provide support for the tilt rod 48 generally at the midlength of the rod. A locking member 49 is adjustably mounted to each of the cross beams 46 and includes a slot engaging portion which abuts and restrains the tilt rod 48 within the slots 47. The locking member 49 includes a pair of adjustment slots 49a that permits the member to be moved up and down along the length of the slot. As the member 49 is moved, the tilt rod 48 is permitted to move up and down within the slot 47 to adjust the orientation of the carriage support assembly 24 to be firmly supported by the frame assembly 22.

When the carriage support assembly 24 is to be tilted into its horizontal orientation, the locking member 49 is removed from the slot 47. With the aid of a block and tackle or other suitable lifting device, the entire carriage support assembly, with the blade carriage assembly mounted thereon, is physically pivoted about the tilt rod 48 so that the rod gradually slides downward within the slots 47 in the cross beams 46. As the carriage support assembly 24 is gradually inclined, the tilt rod 48 moves farther down the slot 47 until it is near the lower end of the slot. At this point, the carriage support assembly 24 abuts the horizontal locking block 38. In this orientation, the carriage support assembly is horizontal and parallel with the ground while the blade carriage assembly 26 is oriented such that the plane of the cutting blade is perpendicular to the ground. In the preferred embodiment, the tilt rod 48 is steel and has a diameter of two inches and a length of 465 inches in order to support the weight of the carriage support and blade carriage assemblies.

Figure 3:
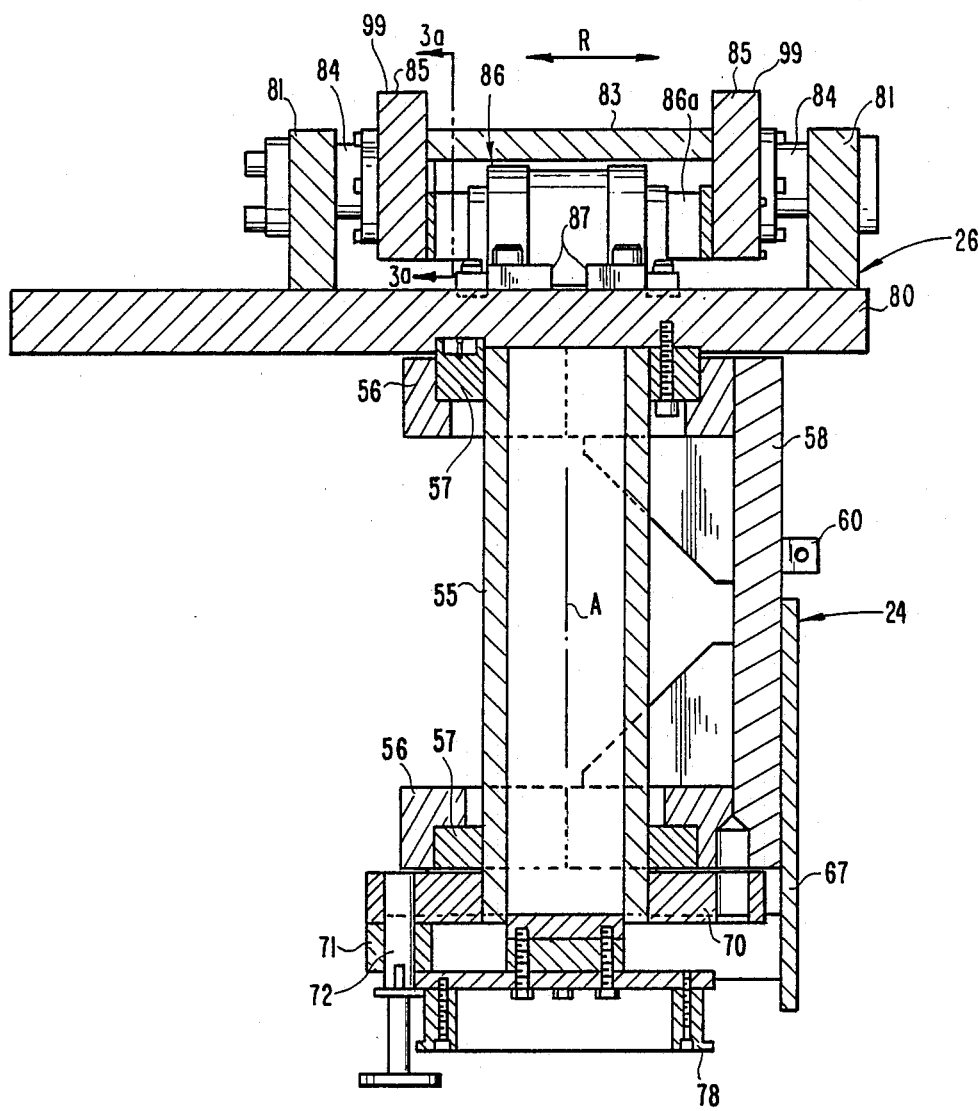
FIG. 3 is a cross-sectional view of the blade carriage support assembly taken along line 3—3 in FIG. 1 as viewed in the direction of the arrows.
Figure 3A:
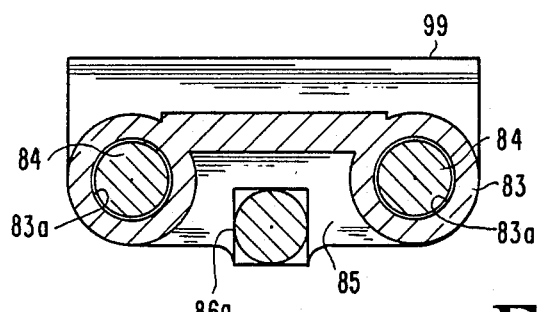
FIG. 3a is a cross-sectional view of the blade carriage support assembly taken along line 3a—3a in FIG. 3 as viewed in the direction of the arrows.

The carriage support assembly 24 is described with particular reference to FIGS. 1-3. The carriage support assembly 24 includes a rotating hub 55 that is affixed to the blade carriage assembly 26. The hub 55 is supported by upper and lower hub bearing collars 56 at opposite ends of the hub. A bearing sleeve 57 is mounted within each hub bearing collar 56 to provide a bearing surface for the rotation of the hub 55. The bearing collars are supported by a back plate 58. A pair of horizontal locking flanges 60 project outwardly from the sides of the back plate 58. Each of the locking flanges 60 includes an opening 60a therethrough. The locking flanges 60 are arranged to straddle the horizontal locking block 38 when the carriage support assembly is pivoted into its horizontal orientation, as shown in FIG. 7. A locking pin 61 extends through the openings 60a in the locking flanges 60 and through the bore 39 in the locking block 38 to fix the carriage support assembly 24 in its horizontal orientation.

A pair of vertical support beams 64 are affixed to the sides of the hub bearing collars 56. At the base of the two vertical support beams 64 is a locking plate 65 having a pair of openings therethrough to match the posts 42 extending from the vertical locking blocks 41 on either side of the carriage support assembly. Thus, when the carriage support assembly 24 is in its vertical orientation, the posts 42 extend through the openings in the support beam locking plates 65 to restrain the carriage support 24 relative to the vertical locking blocks 41. The posts 42 may be threaded to permit a nut to be threaded thereon to affirmatively lock the vertical support beams in place. A side plate 67 overlaps and extends beyond the back plate 58 as shown in FIG. 1. Three rod attachment flanges 68 project from the side plate to which the tilt rod 48 is affixed. As thus far described, the separate elements of the carriage support assemblies and frame assemblies are preferably welded together in the described arrangement. Other suitable means of engaging the respective parts may be utilized.

Figure 4:
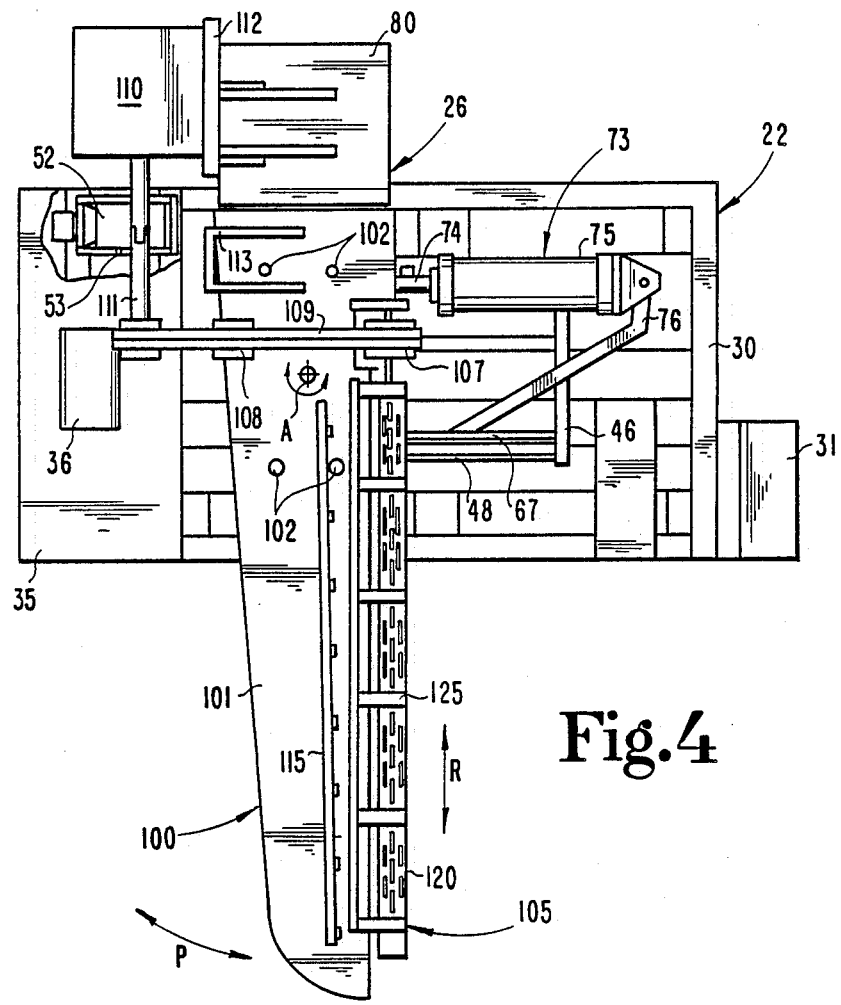
FIG. 4 is a top elevational view of the stone slotting machine of FIG. 1.

The carriage support assembly 24 is permitted to rotate about a blade pitch axis A which extends longitudinally through the center of the rotating hub 55. While the stone slotting machine is being operated, the reciprocating rotating arbor unit may be rotated or pitched about the blade pitch axis A to move the blade into the proper relationship with respect to the limestone L to be cut. Thus, as shown in FIG. 4, the arbor unit or cutting blade, designated as element 100, can be rotated about the axis A so that the unit pitches in the direction P.

Figure 5:
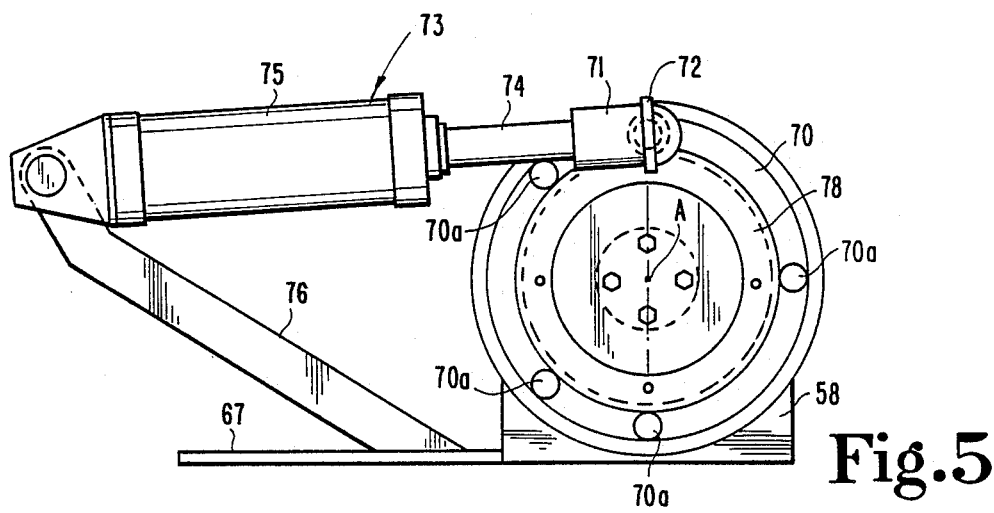
FIG. 5 is an enlarged bottom view of the blade rotating or pitching apparatus.

In order to rotate or pitch the blade, a rotation plate 70 is suitably affixed to the rotating hub 55. The rotation plate 70 includes a number of positioning bores 70a, as shown more clearly in FIG. 5. A link 71 is removably connected to the rotation plate 70 by way of a pin 72 passing through the link 71 and into a particular positioning bore 70a. The pin 72 is connected to the piston rod 74 of a hydraulic piston 73, which piston rod 74 is stroked within the piston cylinder 75. The piston cylinder 75 is supported by a piston support arm 76 that is welded to the side plate 67. As thus constructed, the rotation plate 70 and piston 73 move in unison when the entire carriage support assembly 24 is tilted about the tilt rod 48 from the vertical to the horizontal orientation. Consequently, the piston 73 and rotation plate 70 are operable in either the vertical or horizontal orientation to rotate the hub 55 and blade carriage assembly 26 in the direction P about the blade pitch axis A.

A base flange 78 is mounted to the bottom of the rotating hub 55 to provide an additional support surface when the carriage support assembly in its vertical orientation, as shown in FIGS. 1-3 and 6. The bottom of the base flange 78 preferably rests upon the vertical locking block 41 which is affixed to the frame assembly 22.

The piston 73 is rotatably mounted to the piston support arm 76, and the link 71 is also rotatably mounted relative to the rotation plate 70 by way of the pin 72. Thus, as the piston 73 is stroked, the piston rod 74 forces the rotation plate 70 to rotate or pitch about the blade pitch axis A. The piston rod 74 can be stroked or extended from the piston cylinder 75 a sufficient length to rotate the rotation plate 70 through approximately 90°. If a greater amount of blade pitch or rotation is required, the pin 72 can be removed to permit the link 71 and piston rod 74 to be retracted. At that point, the link can be engaged within a second one of the positioning bores 70a in the rotation plate 70. In this manner, the rotation plate, and consequently the carriage support assembly 24, can be rotated a full 360° about the blade pitch axis A.

The combined tilting and pitching capabilities of the stone slotting machine 20 of the present invention permits a variety of cuts of stone in a quarry. For instance, as shown in FIG. 6, the vertically oriented carriage support assembly permits a horizontal cut into a side wall of limestone L. When the carriage support assembly is tilted into its horizontal orientation, as shown in FIG. 7, a vertical slot $S_v$ can be cut into the limestone L. By rotating the carriage support assembly 24 through 180° about the blade pitch axis A, the cutting blade can be oriented vertically upward, opposite the orientation of the blade shown in FIG. 7. In this manner, a slot can be cut in an overhead section of limestone.

The stone slotting machine 20 further includes a blade carriage assembly 26 which is illustrated in FIGS. 1–3 and FIG. 3a. The blade carriage assembly 26 includes a carriage bed 80 with a pair of end plates 81, one of the end plates being affixed at the end of the carriage bed with the other of the end plates affixed at about three quarters of the length of the bed 80. The end plates define the working region for the reciprocating means that reciprocates the cutting blade in the direction R. The blade carriage assembly 26 includes a reciprocating bearing member 83. A pair of steel bearing shafts 84 are connected between the end plates 81, each passing through a respective one of the pair of bearing sleeves 83a through the reciprocating bearing member 83. Preferrably the bearing surface of the bearing sleeves 83a is composed of bronze, such as by the addition of a bronze bushing. Integral with the reciprocating bearing member is a pair of opposite reciprocator reaction plates 85.

Situated between bearing sleeves 83a is a double action hydraulic piston 86. The double action piston 86 is mounted to the carriage bed 80 by a set of mounting lugs 87 while the piston rod 86a is attached to the opposite reaction plates 85. The double action piston 86 is hydraulically actuated to stroke in the directions represented by the dual arrows R. A pair of limit switches 90 are mounted to the carriage bed 80 (FIG. 2). A pair of switch triggers 91 are affixed to one side of the reciprocating bearing member 83 in an adjustment track 92. The switch triggers can be moved together or apart along the adjustment track. As the double action piston 86 is reciprocated, the reciprocating bearing member 83 moves back and forth in the direction R, which causes the switch triggers 91 to contact the limit switches 90. Closing one of the limit switches causes the piston 86 to be alternatively stroked in the opposite direction. The length of reciprocating stroke R can be varied by changing the relative location of the switch triggers 91. Stone slotting machines of the prior art that used electric motors and eccentrics typically lack the high degree of variability and adaptability of the double action piston and limit switches of the present invention. In the preferred embodiment, the piston 86 is an Atlas Cylinder, Model No. H-5L-DE, having a four inch diameter piston rod 86a with a two inch stroke in either direction. The preferred piston is capable of up to 180 strokes per minute. The bearing member 83 includes a pair of opposite blade mounting pads 99 onto which the cutting blade assembly 100 is affixed to reciprocate with the member 83. The cutting blade assembly 100 includes a blade box beam 101 that provides support for the arbor assembly 105. The blade box beam 101 is affixed to the mounting pads 99 by way of a number of mounting bolts 102. The blade box beam 101 carries an arbor drive pulley 107 which is used to provide rotational motion to the arbor assembly 105. An idler pulley 108 is also mounted to the top of the box beam 101. A drive motor 110 is affixed to a motor mounting plate 112 which is itself affixed to the carriage bed 80. A drive shaft with a universal telescoping drive coupling 111 extends from the drive motor 110. A drive belt is mounted around the arbor drive pulley, the idler pulley and the drive coupling to provide rotational motion from the drive motor 110 to the arbor assembly 105. The drive coupling 111 telescopes relative to the motor to account for the reciprocation of the cutting blade assembly 100.

In the preferred embodiment, the drive motor 110 is a 70 horsepower electric motor capable of turning the arbor assembly at 4000 rpm. Alternatively, a smaller 25 to 40 horse power electric motor can be mounted directly on the reciprocating cutting blade assembly 100 by way of a secondary motor mount 113, as shown in FIG. 4. In this instance, the smaller horse power motor is light enough to be reciprocated along with the cutting blade assembly by the double action piston 86. The selection of the size of the electric motor is determined by the length of the cutting blade that is being utilized. In the preferred embodiment, the cutting blade is a sixteen foot blade, but may be up to a twenty foot blade, which requires the larger horse power motor. In order to keep the size of the double action piston 86 as small as possible, and in order to keep the hydraulic system as small as possible, the electric drive motor 110 must be mounted apart from the reciprocating components. With a sixteen or twenty foot cutting blade, the hydraulic system requires a 30 gallon per minute hydraulic pump 36 on the hydraulic fluid reservoir 35 to provide the requisite fluid power. For cutting blades smaller than sixteen feet the smaller electric motor may be used. Since the motor and smaller cutting blade are lighter, the motor may be mounted directly upon the reciprocating components. The double action piston 86 and the hydraulic system of the stone slotting machine 20 of the present invention are sized to handle the weight of the smaller cutting blade and the smaller electric drive motor.

In the preferred embodiment, a water line 115 extends along the length of the blade box beam 101. The water line 115 is connected to a water source that is separate from the stone slotting machine 20, not shown in the figures. The water line 115 includes a number of orifices along the length of the line that are arranged to direct a flow of water onto the arbor assembly 105 as it is rotating and cutting or slotting the stone. The water is provided to keep the cutting element of the arbor assembly cool and to facilitate washing away the debris that remains during the slotting operation.

The details of the arbor assembly 105 are shown more specifically with reference to FIGS. 8-10. The arbor assembly 105 includes a shaft that is composed of a number of arbor shaft components 120. In the preferred embodiment, each of these arbor shaft components 120 is approximately eight inches long and two and a quarter inches in outer diameter. For longer cutting blades the outer diameter of the shaft components may be increased. The shaft components 120 include a number of cutting bits 121 that are embedded into the shaft component, which are diamond strips in the preferred embodiment. Each of the arbor shaft components 120 includes a threaded bore 123 at the opposite ends of the shaft, as shown in FIGS. 8 and 10. A connecting shaft 132 is threaded into the threaded bore 12 at the end of one shaft component 120 and into the threaded bore 123 of an adjacent shaft component. In this manner, a number of arbor shaft components 120 may be combined to produce an arbor assembly 105 of any desired length.

The arbor assembly 105 is rotationally mounted to the blade box beam 101 by way of a number of bearing supports 125. Each bearing support 125 is mounted by way of bolts 126 at interval along the blade box beam 101. The bearing support 125 carries a bearing 130 in the finger 125a of the support. The connecting shaft 132 extends through the bearing 130, as shown in FIGS. 8 and 10. In the preferred embodiment, the bearing is a fully closed needle bearing, such as the Torrington Model No. JTT1414 that is press fit into the finger 125a. The bearing is sealed to prevent contamination by the water that is constantly sprayed upon the arbor assembly 105 and the stone debris that is present during the cutting operation. The bearing support 125 includes a bore 127 to receive an oil line 128 therethrough. The oil line 128 extends along the entire length of the arbor assembly 105 and provides a flow of oil to the interface between the connecting shaft 132 and the bearing 130. A primary advantage of the arbor assembly 105 of the present invention is that the arbor shaft components 120 are symmetrically designed, such that the threaded bores 123 are the same at either end of the shaft components. In this manner, the arbor shaft components 120 can be oriented in any manner and still be combined to form a complete arbor assembly 105.

A number of arbor shaft components 120 are combined by way of the connecting shafts 132 to form the full length of the arbor assembly. At the end-most bearing support 125, an end piece 135 is threaded onto the end-most connecting shaft 132. A locking bolt 136 extends through the end of the end piece 135 and is threaded into a bore at the end of the connecting shaft 132 to positively lock the entire arbor assembly 105 together.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A stone slotting machine comprising:
    a main frame defining a horizontal plane and including means for moving said main frame along the ground;
    an arbor cutting blade including;
        an arbor frame;
        a number of cutting cylinders attached and aligned together and being rotatably mounted to said arbor frame; and
        means for rotating said number of cutting cylinders relative to said arbor frame; means for supporting said arbor cutting blade on said main frame including;
        an elongated support frame carried by said main frame and having a longitudinal axis;
        means for reciprocating said arbor cutting blade relative to said support frame in a direction perpendicular to said longitudinal axis;
        means for rotating said arbor cutting blade relative to said support frame about said longitudinal axis; and
        means for tilting said support frame relative to said main frame such that said longitudinal axis swings within a vertical plane perpendicular to said horizontal plane.

2. The stone slotting machine of claim 1, wherein said cutting blade includes:
    several sealed bearings mounted at spaced intervals to said arbor frame;
    each of said number of cutting cylinders having a cylindrical body with opposite female threaded ends; and
    several connecting shafts, one each extending through a corresponding one of said several sealed bearings, each of said connecting shafts having opposite male threaded ends adapted to threadedly engage said female threaded ends of adjacent ones of said number of cutting cylinders.

3. The stone slotting machine of claim 1, further comprising:
    said means for reciprocating including a first double action hydraulic piston;
    a reservoir containing hydraulic fluid mounted on said main frame; and
    a pump for pumping said hydraulic fluid from said reservoir to said first double action piston.

4. The stone slotting machine of claim 1, wherein:
    said means for supporting said arbor cutting blade includes;
        a carriage wherein said means for reciprocating is carried by said carriage;
        an elongated hub connected at an end of said hub to said carriage;
    said means for rotating said arbor cutting blade includes;
        bearing collars attached at opposite ends of said support frame wherein said hub is rotatably supported by said collars;
        a rotation plate affixed to said hub; and
        a second hydraulic piston having a piston rod connected at its free end to said rotation plate whereby as said piston rod is stroked said rotation plate is rotated about said longitudinal axis.

5. The stone slotting machine of claim 4, wherein:
    said rotation plate includes a number of circumferentially spaced apart bores; and
    said piston rod includes a removable pin for connecting said piston rod to one of said bores;
    whereby said piston rod is selectably connectable to successive ones of said bores to permit 360° rotation of said rotation plate and said hub about said longitudinal axis.

6. The stone slotting machine of claim 4, wherein said means for tilting includes:
   a pair of spaced apart beams attached to said main frame, each of said pair of beams having a slotted opening therethrough; and
   a rod connected to said support frame and spanning between said pair of beams, said rod being slidably and rotatably disposed within said slotted openings in each of said pair of beams;
   whereby when said support frame is in a first upright position said rod is at a first end of each of said slotted openings and when said support frame is in a second horizontal position said rod is at an opposite second end of each of said slotted openings;
   further whereby said rod slides and rotates within each of said slotted openings as said support frame is tilted from said first upright position to said second horizontal position; and
   wherein said arbor cutting blade is oriented to cut a horizontal slot when said support frame is in said first upright position and said arbor cutting blade is oriented to cut a vertical slot when said support frame is in said second horizontal position.

7. The stone slotting machine of claim 6, wherein said means for tilting includes means for locking said support frame against tilting in each of said first and second positions.

8. The stone slotting machine of claim 7, wherein said means for locking includes at least one locking element removably attached to one of said beams and having an integral portion removably disposed within said slotted opening when said rod is at said first end of said slotted opening to prevent said rod from sliding along said slotted opening.

9. A stone slotting machine comprising:
   a movable main frame;
   an arbor cutting blade having;
      an arbor frame;
      several bearings mounted at spaced intervals to said arbor frame, said several bearings being sealed at their ends to prevent contamination by water or stone particles;
      a number of cutting cylinders attached and aligned together and disposed between said several bearings, each of said number of cutting cylinders having a cylindrical body with opposite female threaded ends;
      several connecting shafts, one each extending through a corresponding one of said several sealed bearings, each of said connecting shafts having opposite male threaded ends adapted to threadedly engage said female threaded ends of adjacent ones of said number of cutting cylinders;
      means for rotating said attached and aligned number of cutting cylinders relative to said arbor frame; and
   means for reciprocatably and rotatably mounting said arbor cutting blade to said main frame including;
      means for providing a flow of oil between each of said sealed bearings and its corresponding connecting shaft.

10. A stone slotting machine comprising:
    a main frame defining a horizontal plane and including means for moving said main frame along the ground;
    a reciprocating arbor cutting blade adapted for cutting a slot in stone;
    means between said main frame and said arbor cutting blade for movably supporting said reciprocating arbor cutting blade on said main frame including;
       means for tilting said arbor cutting blade relative to said main frame about a first axis; and
       means for pivoting said arbor cutting blade relative to said main frame about a second axis,
    wherein said first axis is parallel with said horizontal plane, and said second axis is perpendicular to and rotatable about said first axis.

11. A stone slotting machine comprising:
    a main frame defining a horizontal plane and including means for moving said main frame along the ground;
    a reciprocating arbor cutting blade adapted for cutting a slot in stone;
    means between said main frame and said arbor cutting blade for movably supporting said reciprocating arbor cutting blade on said main frame including;
       means for tilting said arbor cutting blade relative to said main frame about a first axis;
       means for pivoting said arbor cutting blade relative to said main frame about a second axis,
    wherein said first axis is parallel with said horizontal plane, and said second axis is perpendicular to and rotatable about said first axis;
    said reciprocating arbor cutting blade including a first double action hydraulic piston for reciprocating said blade;
    said means for rotating including a second hydraulic piston;
    a reservoir containing hydraulic fluid mounted on said main frame; and
    a hydraulic pump for pumping said fluid from said reservoir to each of said first double action piston and second hydraulic piston.

* * * * *

UNITED STATES PATENT AND TRADEMARK OFFICE
CERTIFICATE OF CORRECTION

PATENT NO. : 4,962,967

DATED : October 16, 1990

INVENTOR(S) : John H. Hinkle

It is certified that error appears in the above-identified patent and that said Letters Patent is hereby corrected as shown below:

In Abstract on the title page, block 57, line 4 please change "includes cutting" to --includes an arbor cutting--.

In Abstract on the title page, block 57, line 17 please change "plae" to --plane --.

In Abstract on the title page, block 57, line 24 please change "main from," to --main frame,--.

Signed and Sealed this

Twenty-first Day of January, 1992

Attest:

HARRY F. MANBECK, JR.

*Attesting Officer*      *Commissioner of Patents and Trademarks*